US012424158B2

(12) United States Patent
Woo

(10) Patent No.: US 12,424,158 B2
(45) Date of Patent: Sep. 23, 2025

(54) DISPLAY DEVICE INCLUDING A LIGHT TRANSMISSION REGION, AND ELECTRONIC DEVICE

(71) Applicant: Samsung Display Co., LTD., Yongin-si (KR)

(72) Inventor: Deokhwa Woo, Suwon-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 17/673,355

(22) Filed: Feb. 16, 2022

(65) Prior Publication Data

US 2023/0011083 A1 Jan. 12, 2023

(30) Foreign Application Priority Data

Jul. 7, 2021 (KR) ........................ 10-2021-0089085

(51) Int. Cl.
*G09G 3/3208* (2016.01)
*G09G 3/20* (2006.01)

(52) U.S. Cl.
CPC ......... *G09G 3/3208* (2013.01); *G09G 3/2007* (2013.01); *G09G 2300/0439* (2013.01); *G09G 2300/0842* (2013.01); *G09G 2310/08* (2013.01)

(58) Field of Classification Search
None
See application file for complete search history.

(56) References Cited

U.S. PATENT DOCUMENTS 11,322,078 B1 * 5/2022 Wang .................. H01L 27/3213
11,798,456 B2 * 10/2023 Qiu ...................... G09G 3/2092
2017/0124960 A1 * 5/2017 Kim ..................... G09G 3/3233
2020/0135147 A1 * 4/2020 Tang ......................... G09G 5/10
2020/0209673 A1 * 7/2020 Lee ..................... H01L 27/3276
2021/0157205 A1 * 5/2021 Tsai .......................... G09G 3/20
2021/0319563 A1 * 10/2021 Zhang ...................... G09G 3/20
(Continued)

FOREIGN PATENT DOCUMENTS

CN 111756914 10/2020
CN 111787138 10/2020
(Continued)

OTHER PUBLICATIONS

Notice of Allowance for Korean Application No. 10-2021-0089085 dated Aug. 11, 2025.

*Primary Examiner* — Benjamin C Lee
*Assistant Examiner* — Emily J Frank
(74) *Attorney, Agent, or Firm* — Harness, Dickey & Pierce, P.L.C.

(57) ABSTRACT

An electronic device includes a processor, a sensor module, and a display device. The display device includes a display panel including a normal display region in which first pixels are disposed, and a light transmission region in which second pixels are disposed, the light transmission region overlapping the sensor module, and a panel driver driving the display panel based on input image data received from the processor, and transferring light transmission region position information representing a position of the light transmission region to the processor. The processor performs a masking operation on the input image data for the light transmission region based on the light transmission region position information in a first mode.

13 Claims, 17 Drawing Sheets

(56) References Cited

U.S. PATENT DOCUMENTS

| | | | | |
|---|---|---|---|---|
| 2022/0068219 | A1 * | 3/2022 | Yoo | G09G 3/3275 |
| 2022/0272246 | A1 * | 8/2022 | Verma | H04N 5/2352 |
| 2022/0392964 | A1 * | 12/2022 | Wu | H10K 59/65 |

FOREIGN PATENT DOCUMENTS

| | | | |
|---|---|---|---|
| CN | 112133197 | | 12/2020 |
| KR | 10-1766248 | | 8/2017 |
| KR | 20210013505 | A | 2/2021 |
| KR | 20210014258 | A | 2/2021 |
| KR | 20210047417 | A | 4/2021 |

* cited by examiner

DISPLAY DEVICE INCLUDING A LIGHT TRANSMISSION REGION, AND ELECTRONIC DEVICE

CROSS-REFERENCE TO RELATED APPLICATION(S)

This application claims priority to and benefits of Korean Patent Application No. 10-2021-0089085 under 35 USC § 119, filed on Jul. 7, 2021 in the Korean Intellectual Property Office (KIPO), the entire contents of which are incorporated herein by reference.

BACKGROUND

1. Technical Field

Embodiments of the disclosure relate to a display device including a light transmission region, and an electronic device including the display device.

2. Description of the Related Art

An electronic device, such as a laptop computer, a smart phone, etc., may include a sensor module, such as a camera module (or an image sensor module), which senses external light to provide various services. Generally, for sensing the external light by the sensor module, a hole may be formed at a frame or a bezel of the electronic device. Thus, in a case where the sensor module is located at a front surface of the electronic device, the bezel of the electronic device may be enlarged, and a screen ratio may be reduced.

Recently, to increase the screen ratio, or a screen-to-body ratio (STBR), a technique that forms a hole for the sensor module within a display region of a display panel of the electronic device has been developed. For example, this technique may be referred to as a hole in active area (HIAA) technique. However, in this HIAA technique, an image may not be displayed at the hole within the display region.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Some embodiments provide an electronic device including a display device that selectively displays an image at a light transmission region.

Some embodiments provide a display device that selectively displays an image at a light transmission region.

According to some embodiments, there is provided an electronic device that may include a processor, a sensor module, and a display device. The display device may include a display panel including a normal display region in which first pixels may be disposed, and a light transmission region in which second pixels may be disposed, the light transmission region overlapping the sensor module, and a panel driver driving the display panel based on input image data received from the processor, and transfers light transmission region position information representing a position of the light transmission region to the processor. The processor may perform a masking operation on the input image data for the light transmission region based on the light transmission region position information in a first mode.

In some embodiments, the processor may convert gray levels represented by the input image data for the light transmission region into a minimum gray level by performing the masking operation.

In some embodiments, the processor may bypass the input image data for the light transmission region in a second mode.

In some embodiments, the first mode may be a light transmission region off mode in which the second pixels do not emit light, and the second mode may be a light transmission region on mode in which the second pixels emit light.

In some embodiments, the processor may determine an operation mode for the display device as the first mode in case that the light transmission region is set as off, and may determine the operation mode for the display device as the second mode in case that the light transmission region is set as on.

In some embodiments, the processor may determine an operation mode for the display device as the first mode in case that the sensor module is activated, and may determine the operation mode for the display device as the second mode in case that the sensor module is inactivated.

In some embodiments, the panel driver may include a flag generating block generating a flag signal representing a timing of receiving the input image data for the light transmission region.

In some embodiments, the flag signal may have a first level while the input image data for the normal display region is received, and the flag signal may have a second level while the input image data for the light transmission region is received.

In some embodiments, the panel driver may further include a light transmission region compensating block performing a light transmission region compensation operation on the input image data for the light transmission region based on the flag signal.

In some embodiments, the panel driver may transfer, as the light transmission region position information, a flag signal representing a timing of receiving the input image data for the light transmission region to the processor.

In some embodiments, the light transmission region position information transferred from the panel driver to the processor may represent a position value and a size value of the light transmission region.

In some embodiments, a size of a driving transistor of each of the second pixels may be greater than a size of a driving transistor of each of the first pixels.

In some embodiments, a number of the second pixels disposed in the light transmission region may be less than a number of the first pixels disposed in the normal display region, with respect to a same area. A light transmitting window may be disposed in the light transmission region such that external light reaches the sensor module through the light transmitting window.

In some embodiments, each of the first pixels may include first light emitting regions emitting lights having different colors. Each of the second pixels may include second light emitting regions emitting lights having the different colors, and a light transmitting window transmitting external light such that the external light reaches the sensor module.

In some embodiments, the sensor module may include at least one of a camera, a face recognition sensor, a proximity sensor, and a motion sensor.

According to some embodiments, there is provided a display device that may include a display panel including a normal display region in which first pixels may be disposed, and a light transmission region in which second pixels may be disposed, the light transmission region overlapping a sensor module, and a panel driver. The panel driver may drive the display panel based on input image data received from a processor. The panel driver may receive a mode signal representing a first mode or a second mode. The panel driver may perform a masking operation on the input image data for the light transmission region in a first mode. The panel driver may bypass the input image data for the light transmission region in a second mode.

In some embodiments, the panel driver may include a flag generating block generating a flag signal representing a timing of receiving the input image data for the light transmission region, and a data masking block performing the masking operation on the input image data for the light transmission region based on the flag signal in the first mode.

In some embodiments, the mode signal may represent the first mode in case that the light transmission region is set as off or in case that the sensor module is activated, and the mode signal may represent the second mode in case that the light transmission region is set as on and the sensor module is inactivated.

According to some embodiments, there is provided an electronic device that may include a processor, a sensor module, and a display device. The display device may include a display panel including a normal display region in which first pixels may be disposed, and a light transmission region in which second pixels may be disposed, the light transmission region overlapping the sensor module, and a panel driver driving the display panel based on input image data received from the processor. The processor may transfer a flag signal representing a timing of receiving the input image data for the light transmission region to the panel driver. A masking operation on the input image data for the light transmission region may be performed based on the flag signal in a first mode, and the input image data for the light transmission region may be bypassed in a second mode.

In some embodiments, an operation mode for the display device may be determined as the first mode in case that the light transmission region is set as off or in case that the sensor module is activated, and the operation mode for the display device may be determined as the second mode in case that the light transmission region is set as on and the sensor module is inactivated.

As described above, in a display device and an electronic device according to some embodiments, a display panel may include a light transmission region overlapping a sensor module, a masking operation may be performed on input image data for the light transmission region in a first mode (e.g., a light transmission region off mode), and the input image data for the light transmission region may be bypassed in a second mode (e.g., a light transmission region on mode). Thus, an image may be selectively displayed at the light transmission region. Accordingly, inconvenience of a user caused by a low resolution of the light transmission region may be resolved, and light emitted by the light transmission region may be prevented from reaching the sensor module.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
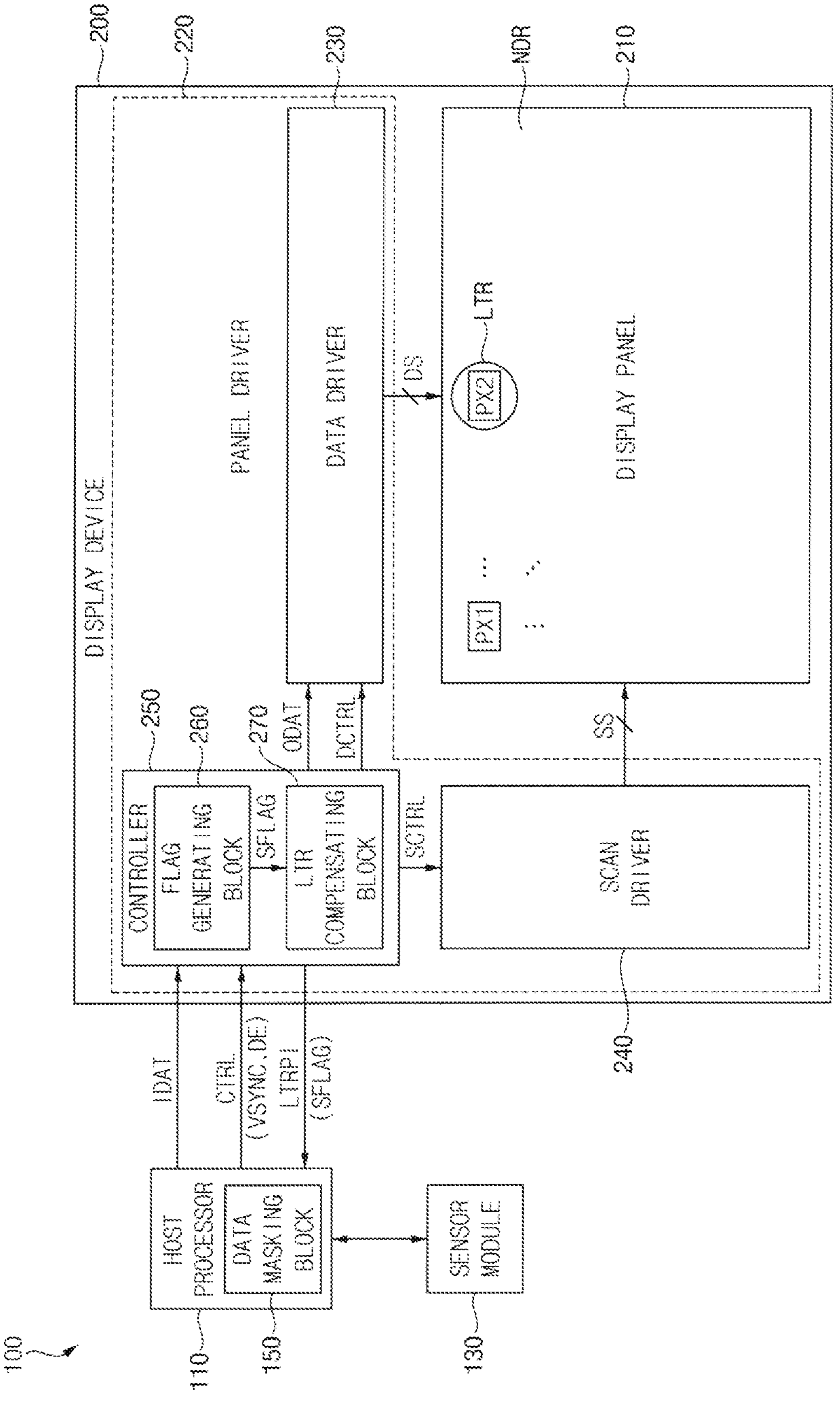
FIG. 1 is a schematic block diagram illustrating an electronic device according to embodiments.

Hereinafter, embodiments of the disclosure will be explained in detail with reference to the accompanying drawings. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

The terms "overlap" or "overlapped" mean that a first object may be above or below or to a side of a second object, and vice versa. Additionally, the term “overlap” may include layer, stack, face or facing, extending over, covering, or partly covering or any other suitable term as would be appreciated and understood by those of ordinary skill in the art.

The terms “comprises,” “comprising,” “includes,” and/or “including,”, “has,” “have,” and/or “having,” and variations thereof when used in this specification, specify the presence of stated features, integers, steps, operations, elements, components, and/or groups thereof, but do not preclude the presence or addition of one or more other features, integers, steps, operations, elements, components, and/or groups thereof.

“About”, “approximately”, “substantially” and the like as used herein are inclusive of the stated value and mean within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
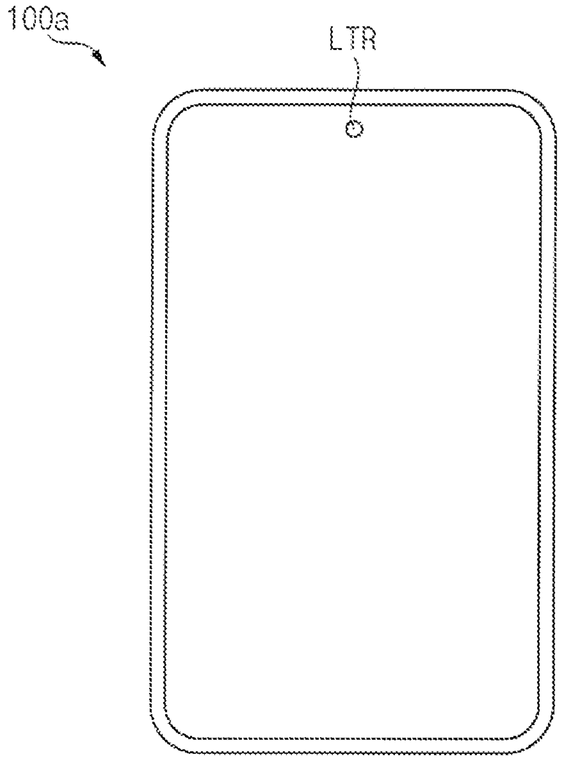
FIGS. 2A and 2B are schematic diagrams illustrating examples of an electronic device according to embodiments.
Figure 2B:
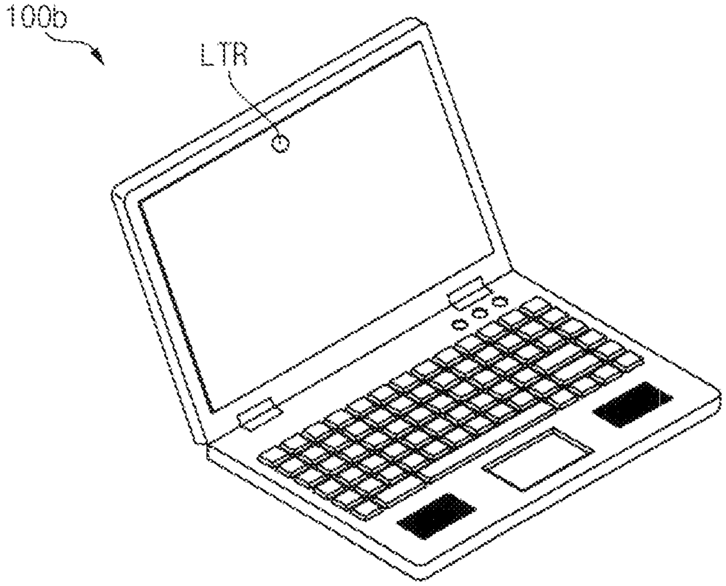
Figure 3:
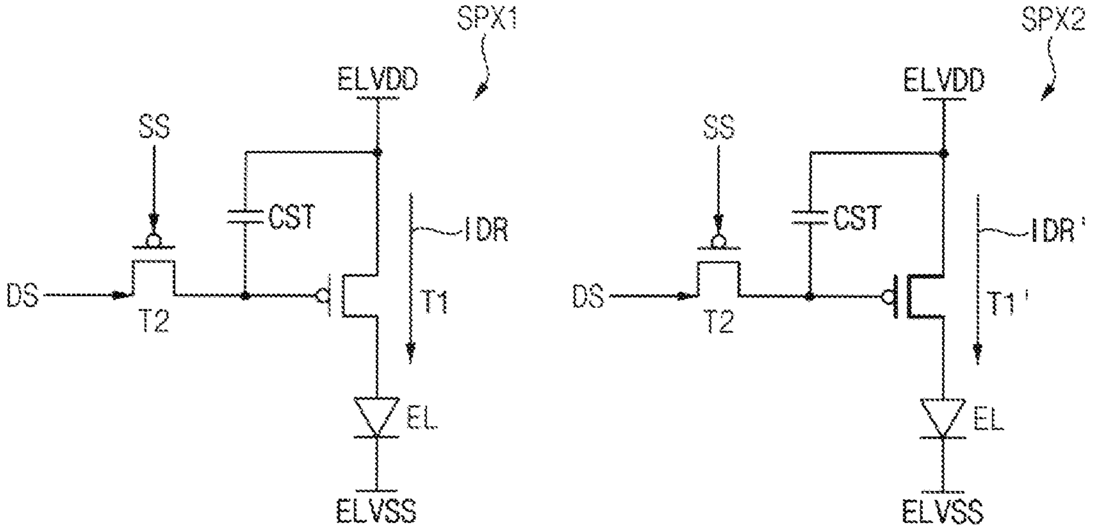
FIG. 3 is a schematic diagram illustrating examples of a first pixel located in a normal display region and a second pixel located in a light transmission region.
Figure 4A:
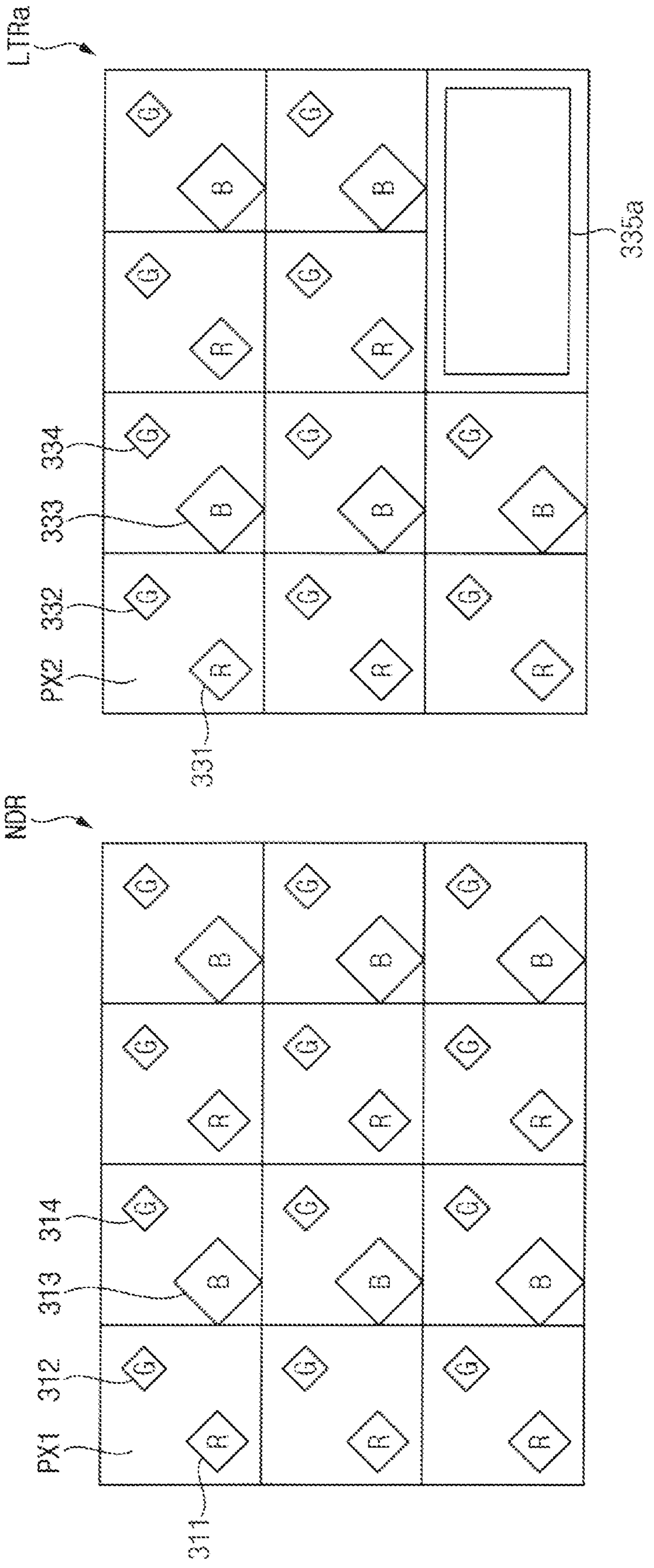
FIGS. 4A through 4C are schematic diagrams illustrating examples of a normal display region and a light transmission region.
Figure 4B:
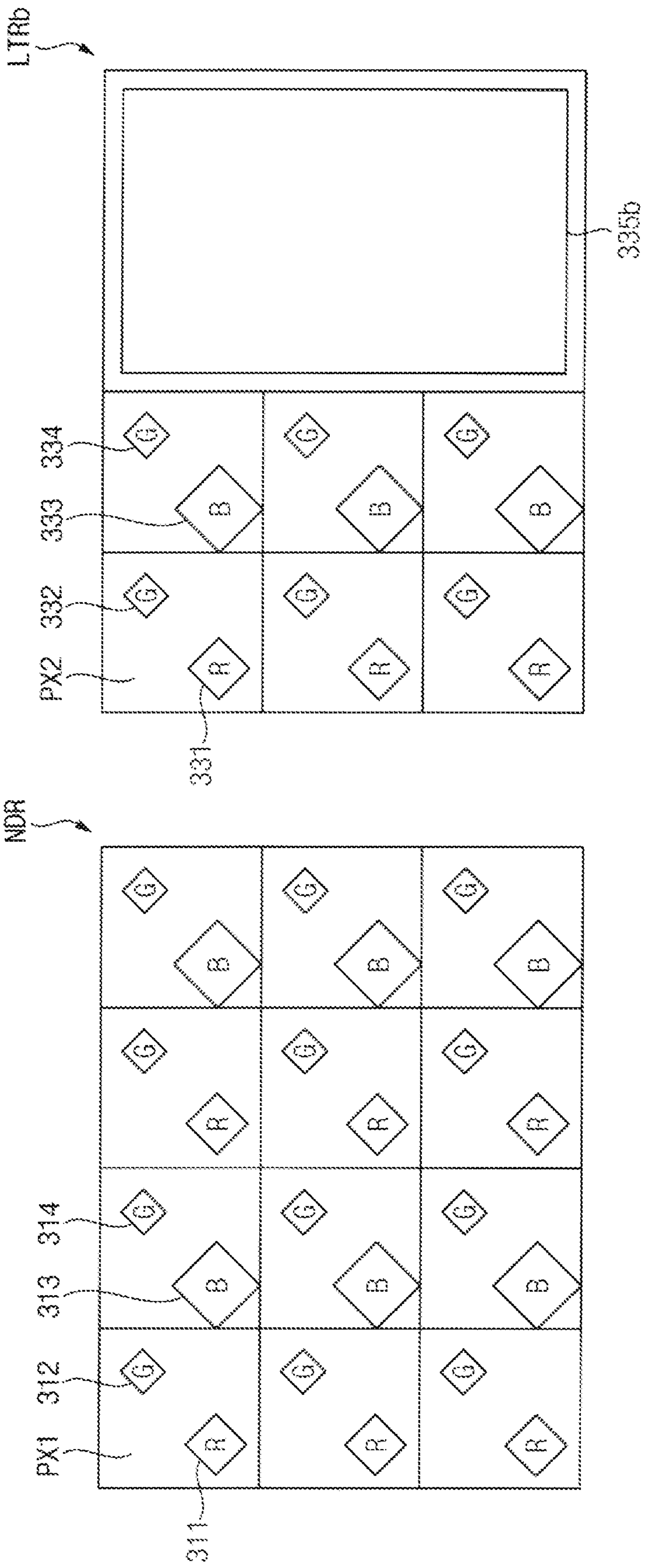
Figure 4C:
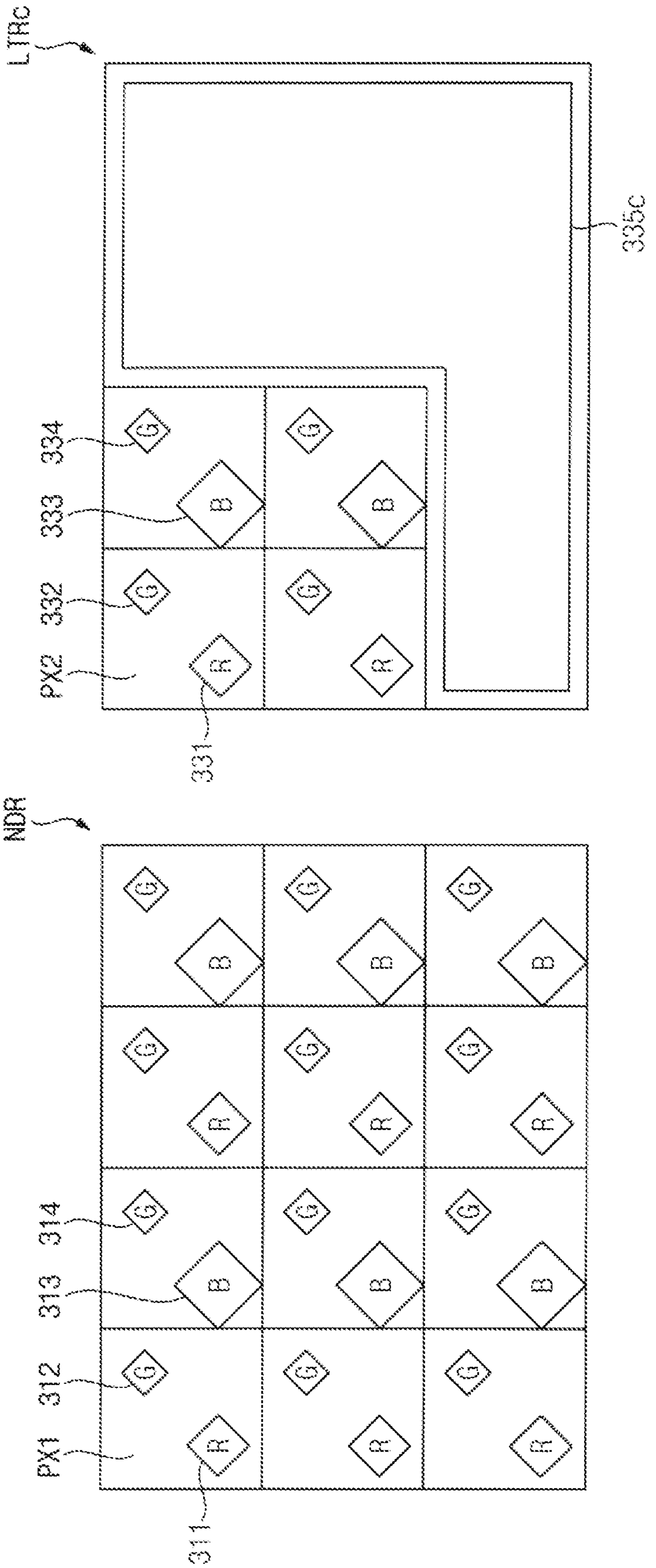
Figure 5A:
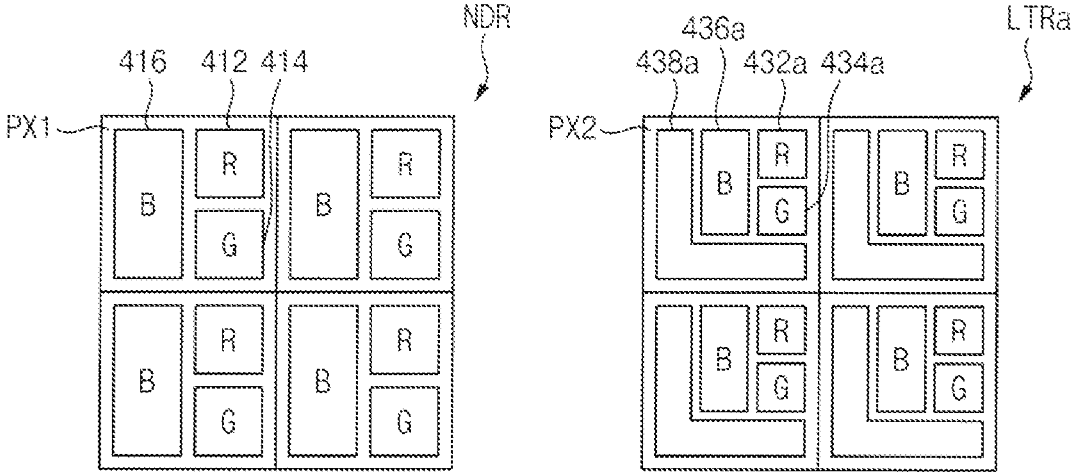
FIGS. 5A through 5C are schematic diagrams illustrating other examples of a normal display region and a light transmission region.
Figure 5B:
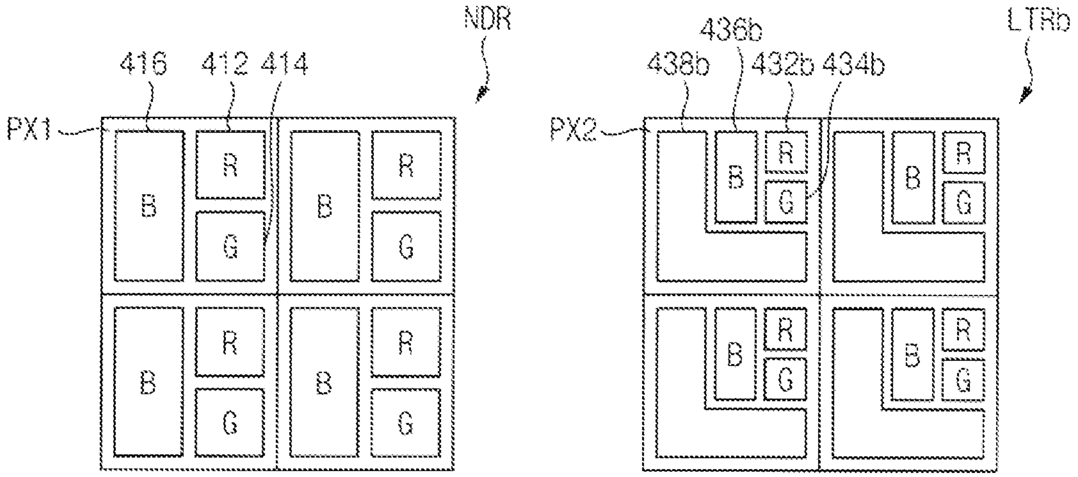
Figure 5C:
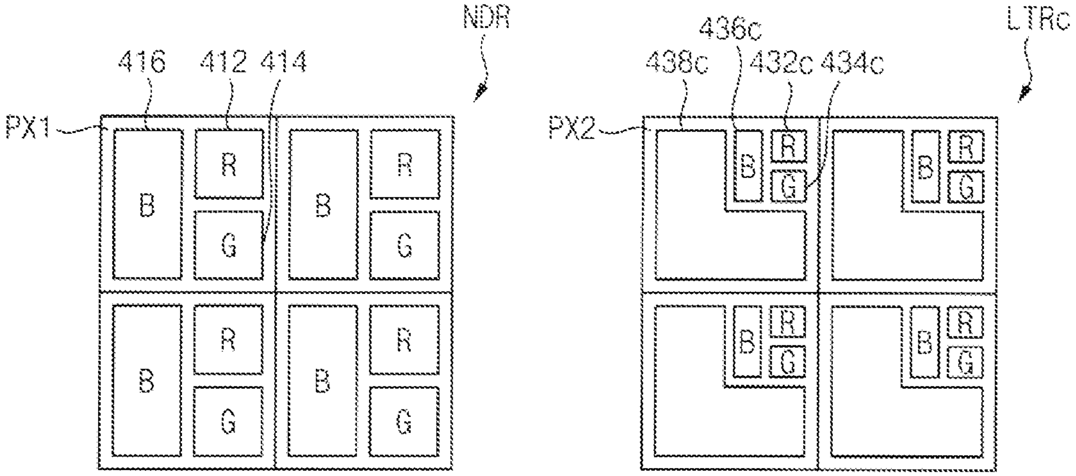
Figure 6:
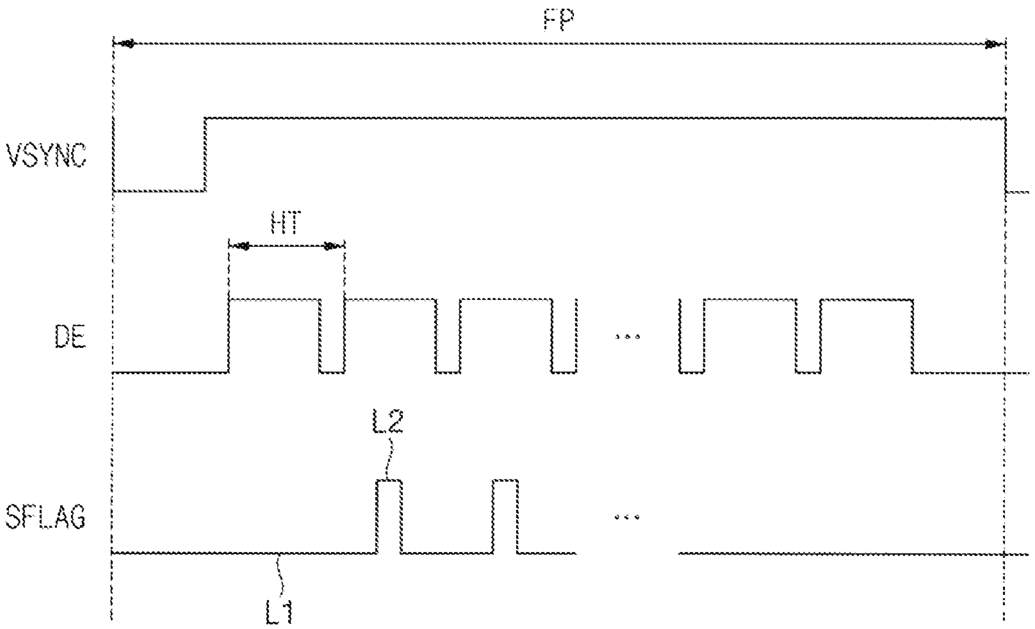
FIG. 6 is a schematic timing diagram for describing a flag signal according to embodiments.
Figure 7:
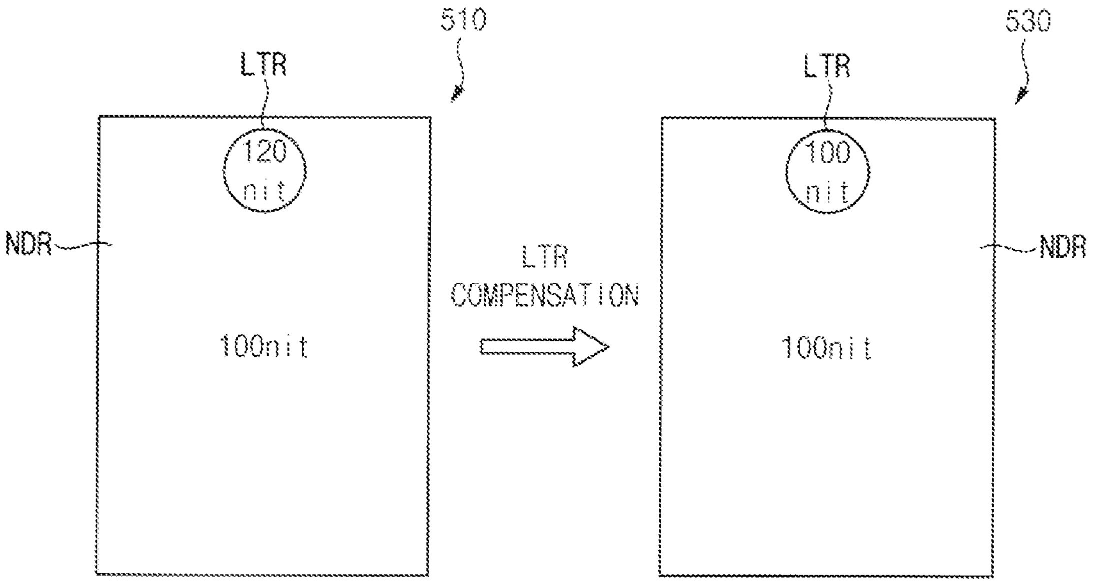
FIG. 7 is a schematic diagram for describing a light transmission region compensation operation according to embodiments.
Figure 8:
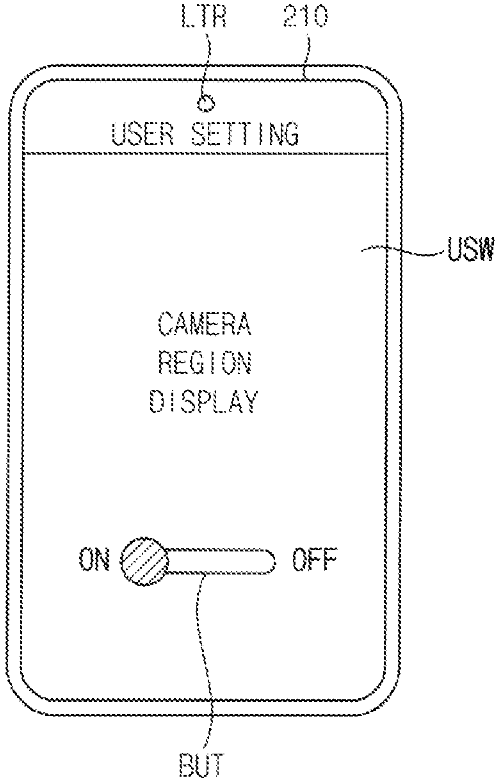
FIG. 8 is a schematic diagram for describing an example where an operation mode for a display device is set.
Figure 9:
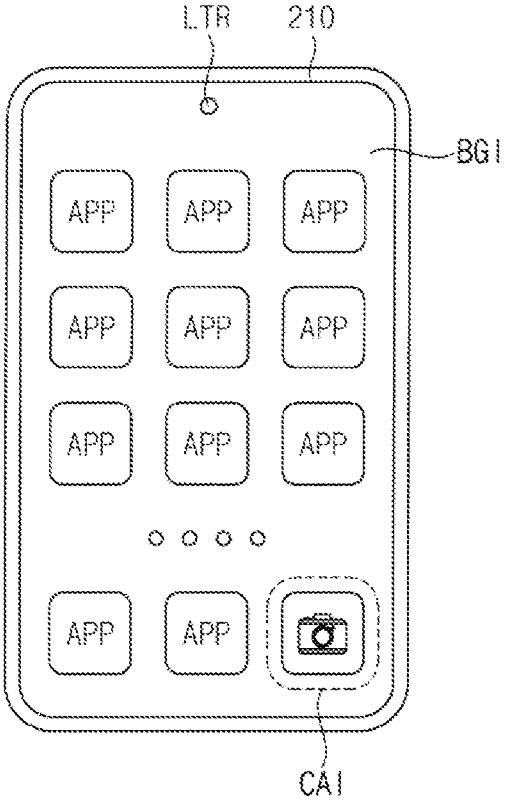
FIG. 9 is a schematic diagram for describing another example where an operation mode for a display device is set.
Figure 10A:
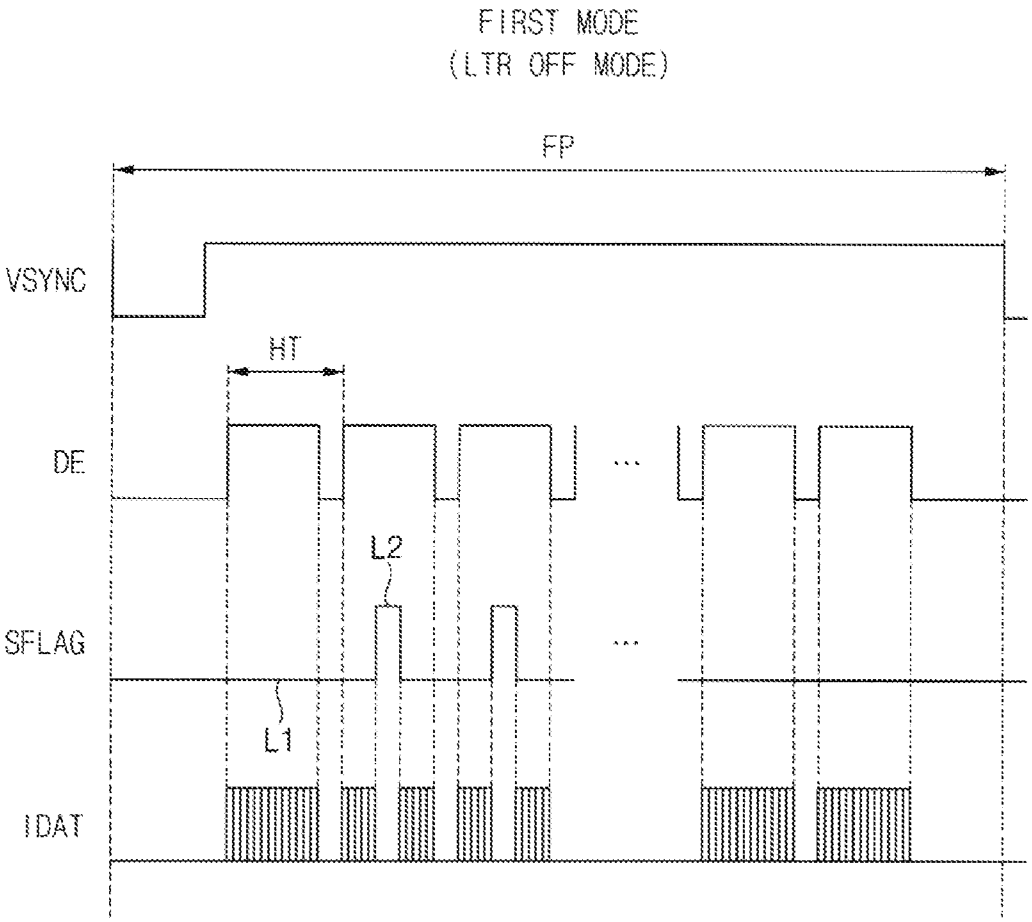
FIG. 10A is a schematic timing diagram for describing an example of a masking operation on input image data for a light transmission region in a first mode.
Figure 10B:
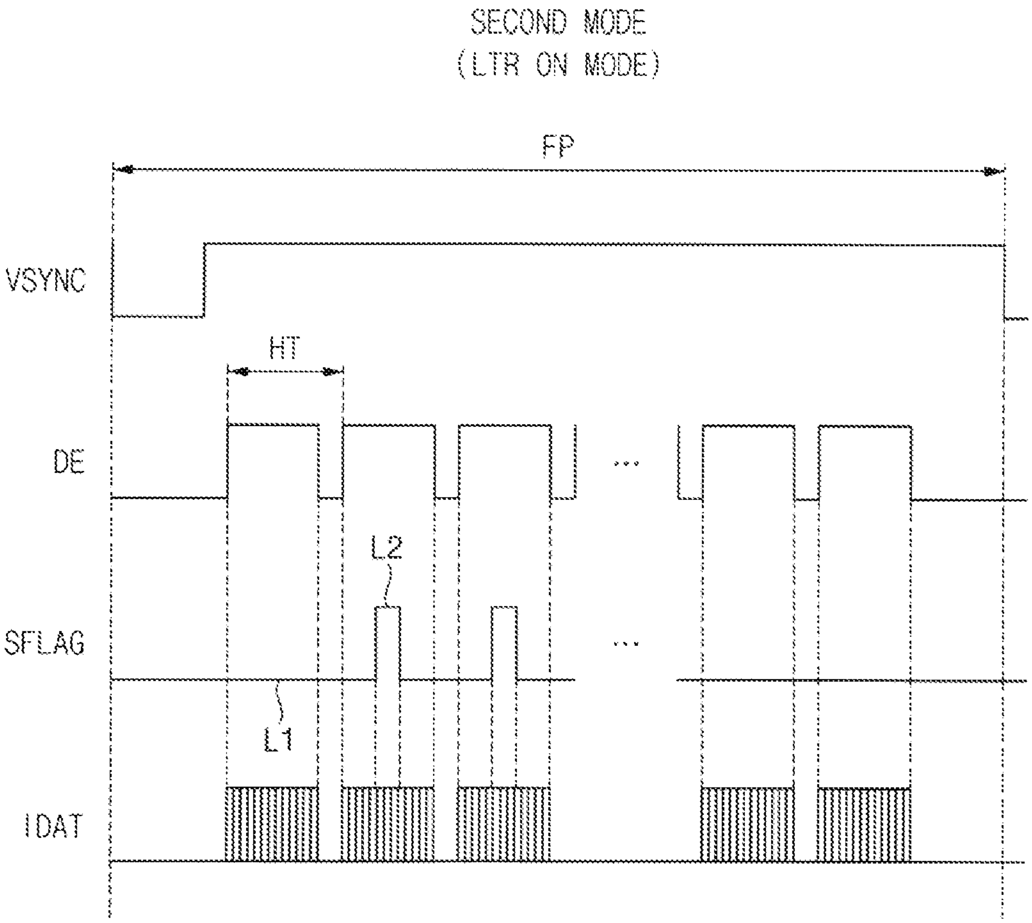
FIG. 10B is a schematic timing diagram for describing an example of a bypass operation on input image data for a light transmission region in a second mode.

FIG. 1 is a schematic block diagram illustrating an electronic device according to embodiments, FIGS. 2A and 2B are schematic diagrams illustrating examples of an electronic device according to embodiments, FIG. 3 is a schematic diagram illustrating examples of a first pixel located (disposed) in a normal display region and a second pixel located in a light transmission region, FIGS. 4A through 4C are schematic diagrams illustrating examples of a normal display region and a light transmission region, FIGS. 5A through 5C are schematic diagrams illustrating other examples of a normal display region and a light transmission region, FIG. 6 is a schematic timing diagram for describing a flag signal according to embodiments, FIG. 7 is a schematic diagram for describing a light transmission region compensation operation according to embodiments, FIG. 8 is a schematic diagram for describing an example where an operation mode for a display device is set, FIG. 9 is a schematic diagram for describing another example where an operation mode for a display device is set, FIG. 10A is a schematic timing diagram for describing an example of a masking operation on input image data for a light transmission region in a first mode, and FIG. 10B is a schematic timing diagram for describing an example of a bypass operation on input image data for a light transmission region in a second mode.

Referring to FIG. 1, an electronic device 100 according to embodiments may include a processor (e.g., host processor) 110, a sensor module 130 and a display device 200. The electronic device 100 according to embodiments may be any electronic device including the display device 200 having a light transmission region LTR.

In some embodiments, as illustrated in FIG. 2A, the electronic device 100 may be a smart phone 100*a* including the light transmission region LTR. In other embodiments, as illustrated in FIG. 2B, the electronic device 100 may be a laptop computer 100*b* including the light transmission region LTR. In still other embodiments, the electronic device 100 may be any electronic device including the display device 200, such as a mobile phone, a tablet computer, a digital television, a 3D television, a virtual reality (VR) device, a personal computer (PC), a home appliance, a wearable device, a personal digital assistant (PDA), a portable multimedia player (PMP), a digital camera, a music player, a portable game console, a navigation system, etc.

The host processor 110 may control an operation of the electronic device 100, and may perform various computing functions or tasks. According to embodiments, the host processor 110 may be an application processor (AP), a graphics processing unit (GPU), a central processing unit (CPU), a microprocessor, etc. The host processor 110 may control the sensor module 130 and the display device 200. For example, the host processor 110 may activate the sensor module 130 to sense external light, and may receive a signal or data representing a sensing result from the sensor module 130. Further, the host processor 110 may provide input image data IDAT and a control signal CTRL to the display device 200 to display an image.

The sensor module 130 may be disposed under the light transmission region LTR such that the sensor module 130 overlaps the light transmission region LTR. The sensor module 130 may include at least one sensor and may be any sensor that receives external light through the light transmission region LTR. In some embodiments, the sensor module 130 may be an image sensor, or a camera. The camera may be disposed under a display panel 210 of the display device 200 to overlap the light transmission region LTR, and thus may be referred to as a under panel camera (UPC). The camera may capture an external image through the light transmission region LTR. In other embodiments, the sensor module 130 may be a face recognition sensor, a proximity sensor, a motion sensor, or the like. The face recognition sensor, the proximity sensor or the motion sensor may be disposed under the display panel 210 to overlap the light transmission region LTR, and thus may be referred to as a under panel sensor (UPS).

The display device 200 may include the display panel 210 that may include pixels PX1 and PX2, and a panel driver 220 that drives the display panel 210. In some embodiments, the panel driver 220 may include a data driver 230 that provides data signals DS to the pixels PX1 and PX2, a scan driver 240 that provides scan signals SS to the pixels PX1 and PX2, and a controller 250 that controls the data driver 230 and the scan driver 240.

The display panel 210 may include scan lines, data lines, and the pixels PX1 and PX2 electrically connected to the scan lines and the data lines. In some embodiments, each pixel PX1 and PX2 (or each sub-pixel of the pixel PX1 and PX2) may include at least one capacitor, at least two transistors and a light emitting diode, and the display panel 210 may be a light emitting display panel. For example, each pixel PX1 and PX2 may include an organic light emitting diode (OLED), and the display panel 210 may be an OLED display panel. In another example, each pixel PX1 and PX2 may include a quantum dot (QD) light emitting diode, and the display panel 210 may be a QD light emitting display panel.

In some embodiments, each pixel PX1 and PX2 may include two or more sub-pixels, for example a red sub-pixel, a green sub-pixel and/or a blue sub-pixel. Further, as illustrated in FIG. 3, each sub-pixel SPX1 and SPX2 of the pixel PX1 and PX2 may include a scan transistor T2 that transfers the data signal DS in response to the scan signal SS, a storage capacitor CST that stores the data signal DS transferred by the scan transistor T2, a driving transistor T1 and T1' that generates a driving current IDR and IDR' based on the data signal DS stored in the storage capacitor CST, and a light emitting diode EL that emits light based on the driving current IDR and IDR' flowing from a line of a first power supply voltage ELVDD to a line of a second power supply voltage ELVSS. For example, the light emitting diode EL may be, but not limited to, an OLED. Although FIG. 3 illustrates an example of each sub-pixel SPX1 and SPX2 having a 2T1C structure including two transistors T1/T1' and T2 and one capacitor CST, a structure of each sub-pixel SPX1 and SPX2 of the display device 200 according to embodiments is not limited to the 2T1C structure. For example, each sub-pixel SPX1 and SPX2 may be any pixel structure, such as a 3T1C structure, a 7T1C structure, a 7T2C structure, etc.

The display panel 210 may include a normal display region NDR that may not transmit external light, and the light transmission region LTR that may transmit the external light. The light transmission region LTR may transmit the external light (and/or light generated by the sensor module 130), and may be located to overlap the sensor module 130 such that the external light reaches the sensor module 130 through the light transmission region LTR. In some embodiments, the sensor module 130 may be an image sensor, or a camera, and the light transmission region LTR may be referred to as a under panel camera (UPC) region. In other embodiments, the light transmission region LTR may be referred to as a under panel sensor (UPS) region. Although FIGS. 1 through 2B illustrate examples where the light transmission region LTR is located at an upper center position of a display region of the display panel 210, according to embodiments, the light transmission region LTR may be located at any position within the display region of the display panel 210.

In the display device 200 and the electronic device 100 according to embodiments, first pixels PX1 located in the normal display region NDR and second pixels PX2 located in the light transmission region LTR may have different resolutions, different arrangements and/or different structures.

In some embodiments, a size of a driving transistor of each of the second pixels PX2 may be greater than a size of a driving transistor of each of the first pixels PX1. For example, as illustrated in FIG. 3, a size of a driving transistor T1' of a second sub-pixel SPX2 of the second pixel PX2 in the light transmission region LTR may be greater than a size of a driving transistor T1 of a first sub-pixel SPX1 of the first pixel PX1 in the normal display region NDR. For example, a channel width of the driving transistor T1' of the second sub-pixel SPX2 in the light transmission region LTR may be greater than a channel width of the driving transistor T1 of the first sub-pixel SPX1 in the normal display region NDR. Thus, in case that the same data signal DS is applied to the first and second sub-pixels PX1 and PX2, the driving current IDR' generated by the driving transistor T1' of the second sub-pixel SPX2 may be greater than the driving current IDR generated by the driving transistor T1 of the first sub-pixel SPX1, and a luminance of the second sub-pixel SPX2 may be higher than a luminance of the first sub-pixel SPX1. Accordingly, even if a resolution of the light transmission region LTR is lower than a resolution of the normal display region NDR, or even if the number of the second pixels PX2 located in the light transmission region LTR is less than the number of the first pixels PX1 located in the normal display region NDR with respect to the same area, a luminance of the light transmission region LTR may not be lower than a luminance of the normal display region NDR.

In some embodiments, the resolution (or pixels per inch (PPI)) of the light transmission region LTR may be lower than the resolution (or PPI) of the normal display region NDR. For example, with respect to the same area, the number of the second pixels PX2 located in the light transmission region LTR may be less than the number of the first pixels PX1 located in the normal display region NDR. For example, as illustrated in FIGS. 4A through 4C, the number of the first pixels PX1 located in an area of the normal display region NDR may be twelve, and the number of the second pixels PX2 in a corresponding area of the light transmission region LTRa, LTRb and LTRc may be less than twelve. Further, the light transmission region LTRa, LTRb and LTRc may include a light transmitting window 335*a*, 335*b* and 335*c* having a size corresponding to a difference between the number of the first pixels PX1 and the number of the second pixels PX2. The light transmission region LTRa, LTRb and LTRc may transmit the external light (and/or light generated by the sensor module 130) through the light transmitting window 335*a*, 335*b* and 335*c*.

In an example, as illustrated in FIG. 4A, ten of the second pixels PX2 may be located in the corresponding area of the light transmission region LTRa, and the light transmission region LTRa may include the light transmitting window 335*a* having a size corresponding to about two of the first (or second) pixels PX1, which corresponds to about 17% of the corresponding area. In another example, as illustrated in FIG. 4B, six of the second pixels PX2 may be located in the corresponding area of the light transmission region LTRb, and the light transmission region LTRb may include the light transmitting window 335*b* having a size corresponding to about six of the first (or second) pixels PX1, which corresponds to about 50% of the corresponding area. In still another example, as illustrated in FIG. 4C, four of the second pixels PX2 may be located in the corresponding area of the light transmission region LTRc, and the light transmission region LTRc may include the light transmitting window 335*c* having a size corresponding to about eight of the first (or second) pixels PX1, which corresponds to about 67% of the corresponding area. Although FIGS. 4A through 4C illustrate examples of the light transmission region LTRa, LTRb and LTRc where the light transmitting windows 335*a*, 335*b*, and 335*c*, which have the respective sizes corresponding to about 17%, about 50%, and about 67% of the corresponding area (e.g., a specific area), are differently located within the area corresponding to twelve of the second pixels PX2, in other embodiments, a ratio of the size of the light transmitting window 335*a*, 335*b*, 335*c* to a size of the light transmission region LTRa, LTRb and LTRc may be any ratio (e.g., may be any ratio that is greater than about 0% and less than about 100%). Further, although FIGS. 4A through 4C illustrates examples where a size of each second pixel PX2 is substantially the same as a size of each first pixel PX1, in other embodiments, the size of the second pixel PX2 may be different from the size of the first pixel PX1. For example, the size of the second pixel PX2 may be greater than the size of the first pixel PX1, and may correspond to about 120%, about 140%, or the like of the size of the first pixel PX1.

Further, in some embodiments, the first pixels PX1 in the normal display region NDR and the second pixels PX2 in the light transmission region LTR may have substantially the same arrangement. For example, as illustrated in FIGS. 4A through 4C, the first pixels PX1 and the second pixels PX2 may be arranged in an RGBG PenTile®/PENTILE® structure (PENTILE® is a registered trademark owned by Samsung Display Co., Ltd.). Each first pixel PX1 may include a first red light emitting region 311 and a first green light emitting region 312, or may include a first blue light emitting region 313 and a second green light emitting region 314. Further, each second pixel PX2 may include a second red light emitting region 331 and a third green light emitting region 332, or may include a second blue light emitting region 333 and a fourth green light emitting region 334. Here, each light emitting region 311, 312, 313, 314, 331, 332, 333 and 334 may be a region of the light emitting diode EL illustrated in FIG. 3. Although FIGS. 4A through 4C illustrate examples where the first pixels PX1 and the second pixels PX2 are arranged in the RGBG PenTile®/PENTILE® structure, the arrangement of the first pixels PX1 and/or the arrangement of the second pixels PX2 are not limited to the RGBG PenTile®/PENTILE® structure.

In other embodiments, the first pixels PX1 in the normal display region NDR and the second pixels PX2 in the light transmission region LTR may have substantially the same resolution, but may have different structures. For example, as illustrated in FIGS. 5A through 5C, a resolution (or PPI) of the light transmission region LTRa, LTRb and LTRc may be substantially the same as a resolution (or PPI) of the normal display region NDR, but each second pixel PX2 in the light transmission region LTRa, LTRb and LTRc may further include a light transmitting window 438*a*, 438*b*, and 438*c*, compared with each first pixel PX1 in the normal display region NDR.

As illustrated in FIGS. 5A through 5C, the first pixel PX1 in the normal display region NDR may include first light emitting regions 412, 414, and 416 that may respectively emit lights having different colors. For example, the first pixel PX1 may include a first red light emitting region 412, a first green light emitting region 414 and a first blue light emitting region 416, and the first red, green, and blue light emitting regions 412, 414 and 416 may be regions of red, green, and blue light emitting diodes. Further, as illustrated in FIGS. 5A through 5C, the second pixel PX2 in the light transmission region LTRa, LTRb and LTRc may include second light emitting regions 432*a*, 434*a*, 436*a*, 432*b*, 434*b*, 436*b*, 432*c*, 434*c* and 436*c* that emit lights having the different colors, and a light transmitting window 438*a*, 438*b* and 438*c* that transmits the external light such that the external light reaches the sensor module 130. For example, the second pixel PX2 may include a second red light emitting region 432*a*, 432*b* and 432*c*, a second green light emitting region 434*a*, 434*b* and 434*c*, a second blue light emitting region 436*a*, 436*b* and 436*c* and the light transmitting window 438*a*, 438*b* and 438*c*, and the second red, green, and blue light emitting regions 432*a*, 434*a*, 436*a*, 432*b*, 434*b*, 436*b*, 432*c*, 434*c* and 436*c* may be regions of red, green, and blue light emitting diodes. Further, the light transmission region LTRa, LTRb and LTRc may transmit the external light (and/or light generated by the sensor module 130) through the light transmitting window 438*a*, 438*b* and 438*c* included in each second pixel PX2.

Further, a size of the second light emitting regions 432*a*, 434*a*, 436*a*, 432*b*, 434*b*, 436*b*, 432*c*, 434*c* and 436*c* of each second pixel PX2 may be different from a size of the first light emitting regions 412, 414 and 416 of each first pixel PX1, and a size of the light transmitting window 438*a*, 438*b* and 438*c* included in each second pixel PX2 may correspond to a difference between the size of the first light emitting regions 412, 414 and 416 and the size of the second light emitting regions 432*a*, 434*a*, 436*a*, 432*b*, 434*b*, 436*b*, 432*c*, 434*c* and 436*c*. In an example, as illustrated in FIG. 5A, the size of the second light emitting regions 432*a*, 434*a* and 436*a* of each second pixel PX2 may be about 70% of the size of the first light emitting regions 412, 414 and 416, and the size of the light transmitting window 438*a* included in each second pixel PX2 may be about 30% of the size of the first light emitting regions 412, 414 and 416. In another example, as illustrated in FIG. 5B, the size of the second light emitting regions 432*b*, 434*b* and 436*b* of each second pixel PX2 may be about 50% of the size of the first light emitting regions 412, 414 and 416, and the size of the light transmitting window 438*b* included in each second pixel PX2 may be about 50% of the size of the first light emitting regions 412, 414 and 416. In still another example, as illustrated in FIG. 5C, the size of the second light emitting regions 432*c*, 434*c* and 436*c* of each second pixel PX2 may be about 25% of the size of the first light emitting regions 412, 414 and 416, and the size of the light transmitting window 438*c* included in each second pixel PX2 may be about 75% of the size of the first light emitting regions 412, 414 and 416. Although FIGS. 5A through 5C illustrate examples of each second pixel PX2 where the size of the light transmitting windows 438*a*, 438*b* and 438*c* respectively corresponds to about 30%, about 50% and about 75% of the size of the first light emitting regions 412, 414 and 416, in other embodiments, the light transmitting window 438*a*, 438*b* and 438*c* of each second pixel PX2 may have any size, or may have a size that is greater than about 0% and less than about 100% of the size of the first light emitting regions 412, 414 and 416. Further, although FIGS. 5A through 5C illustrate examples where the size of the second light emitting regions 432*a*, 434*a*, 436*a*, 432*b*, 434*b*, 436*b*, 432*c*, 434*c* and 436*c* of each second pixel PX2 is smaller than the size of the first light emitting regions 412, 414 and 416 of each first pixel PX1, in other embodiments, the size of the second light emitting regions 432*a*, 434*a*, 436*a*, 432*b*, 434*b*, 436*b*, 432*c*, 434*c* and 436*c* of each second pixel PX2 may be larger than the size of the first light emitting regions 412, 414 and 416. For example, the size of the second light emitting regions 432*a*, 434*a*, 436*a*, 432*b*, 434*b*, 436*b*, 432*c*, 434*c* and 436*c* of each second pixel PX2 may correspond to about 120%, about 140%, or the like of the size of the first light emitting regions 412, 414 and 416 of each first pixel PX1. The number of the second pixels PX2 in the light transmission region LTR may be less than the number of the first pixels PX1 in the normal display region NDR.

Referring again to FIG. 1, the data driver 230 may generate the data signals DS based on a data control signal DCTRL and output image data ODAT received from the controller 250, and may provide the data signals DS to the pixels PX1 and PX2 through the data lines.

In some embodiments, the data control signal DCTRL may include, but not limited to, an output data enable signal, a horizontal start signal and a load signal. In some embodiments, the data driver 230 and the controller 250 may be implemented with a single integrated circuit, and the integrated circuit may be referred to as a timing controller embedded data driver (TED). In other embodiments, the data driver 230 and the controller 250 may be implemented with separate integrated circuits.

The scan driver 240 may generate the scan signals SS based on a scan control signal SCTRL received from the controller 250, and may provide the scan signals SS to the pixels PX1 and PX2 through the scan lines. In some embodiments, the scan control signal SCTRL may include, but is not limited to, a scan start signal and a scan clock signal. In some embodiments, the scan driver 240 may be integrated or formed in a peripheral portion of the display panel 210. In other embodiments, the scan driver 240 may be implemented with one or more integrated circuits.

The controller 250 (e.g., a timing controller (TCON)) may receive input image data IDAT and a control signal CTRL from the host processor 110. In some embodiments, the control signal CTRL may include, but is not limited to, a vertical synchronization signal VSYNC, a horizontal synchronization signal, a data enable signal DE, a master clock signal, etc. The controller 250 may generate the output image data ODAT, the data control signal DCTRL and the scan control signal SCTRL based on the input image data IDAT and the control signal CTRL. The controller 250 may control an operation of the data driver 230 by providing the output image data ODAT and the data control signal DCTRL to the data driver 230, and may control an operation of the scan driver 240 by providing the scan control signal SCTRL to the scan driver 240.

In the display device 200 of the electronic device 100 according to embodiments, the controller 250 of the panel driver 220 may include a flag generating block 260 that generates a flag signal SFLAG representing a timing of receiving or processing the input image data IDAT for the light transmission region LTR. FIG. 6 illustrates an example of the flag signal SFLAG generated by the flag generating block 260. As illustrated in FIG. 6, a frame period FP defined by the vertical synchronization signal VSYNC may include horizontal times HT defined by the data enable signal DE. Each horizontal time HT may be a time during which the input image data IDAT for one pixel row is received or processed. Further, as illustrated in FIG. 6, the flag signal SFLAG may have a first level L1 (e.g., a low level) while the input image data IDAT for the normal display region NDR is received or processed, and may have a second level L2 (e.g., a high level) while the input image data IDAT for the light transmission region LTR is received or processed. Thus, the flag signal SFLAG may be used as light transmission region position information LTRPI representing a position of the light transmission region LTR.

The controller 250 of the panel driver 220 may further include a light transmission region compensating block 270 that performs a light transmission region compensation operation on the input image data IDAT for the light transmission region LTR based on the flag signal SFLAG. For example, while the flag signal SFLAG having the second level L2 is received, the light transmission region compensating block 270 may perform the light transmission region compensation operation on the input image data IDAT. In some embodiments, the light transmission region compensation operation performed by the light transmission region compensating block 270 may be an operation that decreases a luminance of the light transmission region LTR. For example, in a case where the light transmission region compensation operation is not performed, even if the input image data IDAT represents the same gray level with respect to the entire region of the display panel 210, a luminance (e.g., about 120 nit) of the light transmission region LTR may be higher than a luminance (e.g., about 100 nit) of the normal display region NDR as illustrated as 510 in FIG. 7. However, in the display device 200 of the electronic device 100 according to embodiments, the light transmission region compensating block 270 may perform the light transmission region compensation operation that decreases the input image data IDAT for the light transmission region LTR in response to the flag signal SFLAG having the second level L2. As illustrated as 530 in FIG. 7, the luminance (e.g., about 100 nit) of the light transmission region LTR may be substantially the same as the luminance (e.g., about 100 nit) of the normal display region NDR. In other embodiments, the light transmission region compensation operation performed by the light transmission region compensating block 270 may include a boundary color correction operation that corrects a color at a boundary of the light transmission region LTR, or any other suitable operations.

As described above, in the electronic device 100 according to embodiments, the display device 200 may include the light transmission region LTR overlapping the sensor module 130, and the light transmission region LTR may display an image. Thus, a bezel of the electronic device 100 may be reduced, a screen ratio (e.g., a screen-to-body ratio (STBR)) may be increased, and an image may be displayed at the entire display region of the display panel 210. However, the resolution of the light transmission region LTR may be lower than the resolution of the normal display region NDR, and thus a user may be inconvenienced by the low resolution of the light transmission region LTR. Further, in a case where the light transmission region LTR displays an image while the sensor module 130 is activated, light emitted by the light transmission region LTR may reach the sensor module 130, and thus accuracy of the sensor module 130 may be decreased.

To solve these problems, in the electronic device 100 according to embodiments, the display device 200 may selectively display an image at the light transmission region LTR. To perform this operation, the host processor 110 may determine an operation mode for the display device 200 as a first mode or a second mode. The display device 200 may not display an image (or may display a black image) at the light transmission region LTR in the first mode, and may display an image at the light transmission region LTR in the second mode. Thus, the first mode may be a light transmission region off mode in which the second pixels PX2 in the light transmission region LTR do not emit light, and the second mode may be a light transmission region on mode in which the second pixels PX2 emit light.

In some embodiments, the host processor 110 may determine the operation mode for the display device 200 as the first mode or the second mode according to a user setting. For example, the host processor 110 may determine the operation mode for the display device 200 as the first mode in case that the light transmission region LTR is set as off, and may determine the operation mode for the display device 200 as the second mode in case that the light transmission region LTR is set as on. For example, as illustrated in FIG. 8, if a user setting application is executed in the electronic device 100, the display panel 210 may display a user setting window USW. A user may set the light transmission region LTR as OFF or ON using a sliding button BUT of the user setting window USW. The host processor 110 may determine the operation mode for the display device 200 as the first mode or the second mode according to the OFF or ON setting for the light transmission region LTR by the user.

In other embodiments, the host processor 110 may determine the operation mode for the display device 200 as the first mode or the second mode according to whether the sensor module 130 is activated. For example, the host processor 100 may determine the operation mode for the display device 200 as the first mode in case that the sensor module 130 is activated, and may determine the operation mode for the display device 200 as the second mode in case that the sensor module 130 is inactivated. For example, as illustrated in FIG. 9, a background image BGI displayed by the display panel 210 may include icons of applications APP. If a user clicks an icon CAI of a camera application among the icons of the applications APP, the camera application is executed, and the sensor module 130, or a camera may be activated. If the camera application is executed, or if the camera is activated, the host processor 110 may determine the operation mode for the display device 200 as the first mode. In other embodiments, if the camera application is terminated, or the camera is inactivated, the host processor 110 may determine the operation mode for the display device 200 as the second mode.

In still other embodiments, the host processor 110 may determine the operation mode for the display device 200 as the first mode in case that the light transmission region LTR is set as off or in case that the sensor module 130 is activated, and may determine the operation mode for the display device 200 as the second mode in case that the light transmission region LTR is set as on and the sensor module 130 is inactivated.

To allow the light transmission region LTR to not display an image (or to display a black image), the controller 250 of the panel driver 220 may transfer the light transmission region position information LTRPI representing a position of the light transmission region LTR to the host processor 110, and the host processor 110 may perform a masking operation on the input image data IDAT for the light transmission region LTR based on the light transmission region position information LTRPI in the first mode. For example, once the electronic device 100 is powered on, the controller 250 may transfer the light transmission region position information LTRPI to the host processor 110 in a first frame period after power-on, the host processor 110 may store the light transmission region position information LTRPI transferred from the controller 250, and the host processor 110 may perform the masking operation based on the light transmission region position information LTRPI in subsequent frame periods.

In some embodiments, as illustrated in FIG. 1, the controller 250 of the panel driver 220 may transfer, as the light transmission region position information LTRPI, the flag signal SFLAG representing a timing of receiving the input image data IDAT for the light transmission region LTR to the host processor 110. The host processor 110 may include a data masking block 150 that performs the masking operation on the input image data IDAT for the light transmission region LTR based on the flag signal SFLAG in the first mode (or the light transmission region off mode). For example, in the first mode, or in the light transmission region off mode, as illustrated in FIG. 10A, the data masking block 150 may perform the masking operation on the input image data IDAT while the flag signal SFLAG has the second level L2 (e.g., the high level). Further, the masking operation performed by the data masking block 150 may be an operation that converts gray levels represented by the input image data IDAT for the light transmission region LTR into a minimum gray level (e.g., a 0-gray level). In the first mode, or in the light transmission region off mode, the display device 200 may receive the input image data IDAT on which the masking operation is performed, or the input image data IDAT representing the 0-gray level with respect to the light transmission region LTR, and may not display an image (or may display a black image) at the light transmission region LTR based on the input image data IDAT. Accordingly, the inconvenience of the user caused by the low resolution of the light transmission region LTR may be resolved, and the light emitted by the light transmission region LTR may be prevented from reaching the sensor module 130.

To display an image at the light transmission region LTR in the second mode, the host processor 110 may bypass the input image data IDAT for the light transmission region LTR in the second mode. Here, bypassing the input image data IDAT may mean that the masking operation is not performed on the input image data IDAT, and the input image data IDAT may be passed-throuqh. For example, in the second mode, or in the light transmission region on mode, as illustrated in FIG. 10B, even if the flag signal SFLAG has the second level L2, the data masking block 150 may not perform the masking operation on the input image data IDAT, and may bypass the input image data IDAT for the light transmission region LTR. In the second mode, or in the light transmission region on mode, the display device 200 may receive the input image data IDAT on which the masking operation is not performed, and may display an image at the light transmission region LTR based on the input image data IDAT. Accordingly, since an image is displayed at the light transmission region LTR, an image may be displayed at the entire display region of the display panel 210.

As described above, in the electronic device 100 according to embodiments, the display panel 210 may include the light transmission region LTR overlapping the sensor module 130, the panel driver 220 may transfer the flag signal SFLAG to the host processor 110, the host processor 110 may perform the masking operation on the input image data IDAT for the light transmission region LTR in the first mode, and the host processor 110 may bypass the input image data IDAT for the light transmission region LTR in the second mode. Thus, an image may be selectively displayed at the light transmission region LTR. Accordingly, the inconvenience of the user caused by the low resolution of the light transmission region LTR may be resolved, and the light emitted by the light transmission region LTR may be prevented from reaching the sensor module 130.

Figure 11:
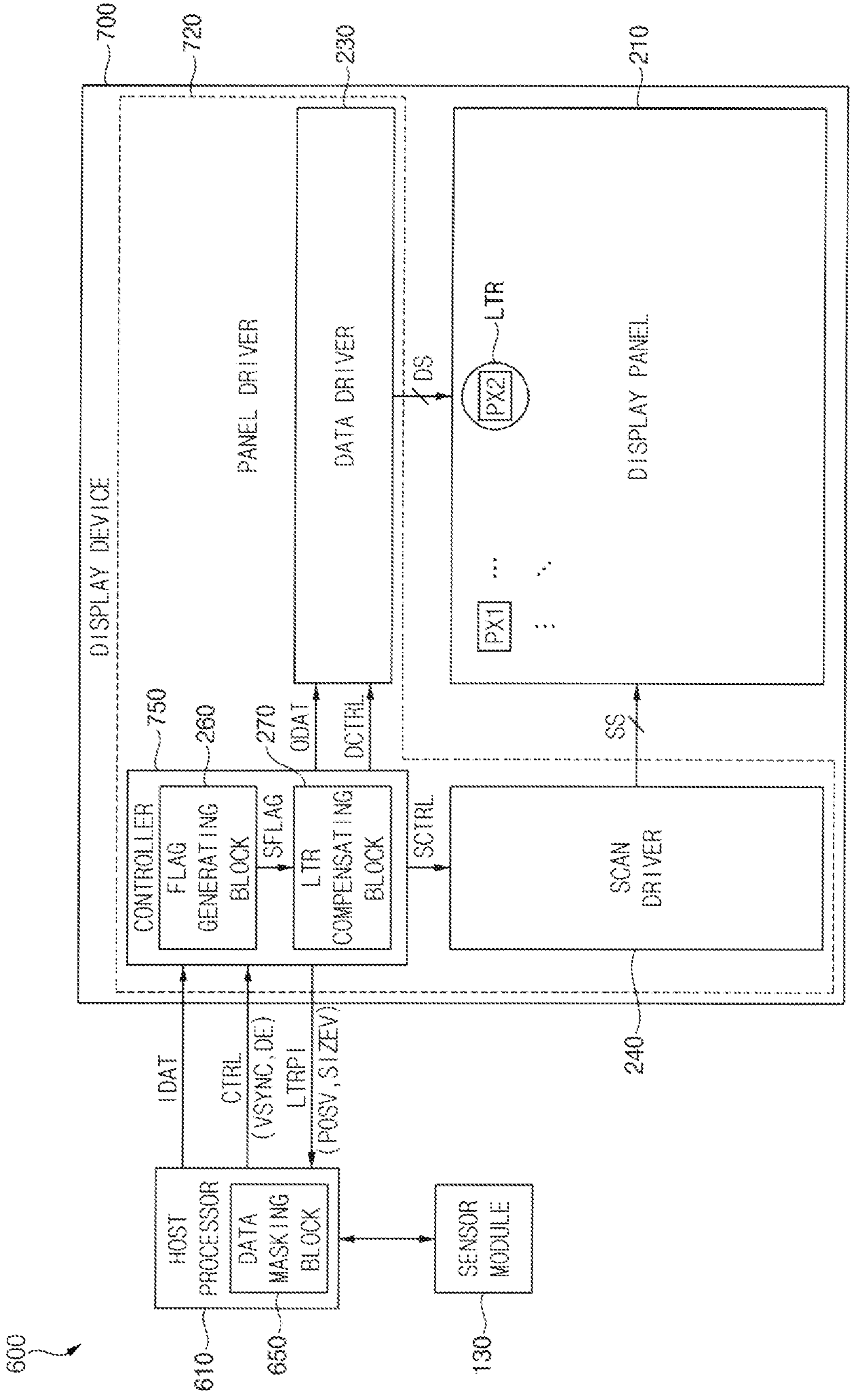
FIG. 11 is a schematic block diagram illustrating an electronic device according to embodiments.
Figure 12A:
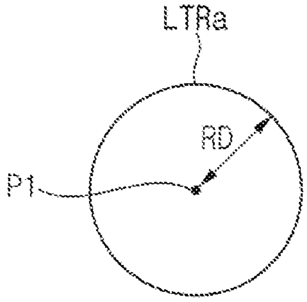
FIGS. 12A and 12B are schematic diagrams illustrating examples of a light transmission region.
Figure 12B:
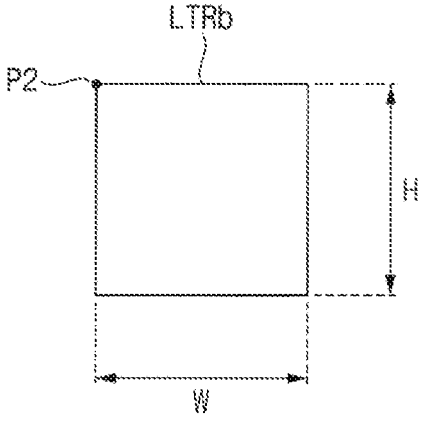

FIG. 11 is a schematic block diagram illustrating an electronic device according to embodiments, and FIGS. 12A and 12B are schematic diagrams illustrating examples of a light transmission region.

Referring to FIG. 11, an electronic device 600 according to embodiments may include a host processor 610, a sensor module 130 and a display device 700. The host processor 610 may include a data masking block 650. The display device 700 may include a display panel 210 and a panel driver 720. The panel driver 720 may include a data driver 230, a scan driver 240 and a controller 750. The electronic device 600 of FIG. 11 may have a similar configuration and a similar operation to an electronic device 100 of FIG. 1, except at least that the controller 750 of the panel driver 720 may transfer, as light transmission region position information LTRPI, a position value POSV and a size value SIZEV of a light transmission region LTR to the host processor 610 instead of a flag signal SFLAG.

The controller 750 of the panel driver 720 may transfer the light transmission region position information LTRPI representing the position value POSV and the size value SIZEV of the light transmission region LTR to the host processor 610. For example, as illustrated in FIG. 12A, the light transmission region LTRa may have a circular shape, and the controller 750 may transfer, as the light transmission region position information LTRPI, the position value POSV representing a position of a center point P1 of the light transmission region LTRa and the size value SIZEV representing a radius of the light transmission region LTRa to the host processor 610. In another example, as illustrated in FIG. 12B, the light transmission region LTRb may have a rectangular shape, and the controller 750 may transfer, as the light transmission region position information LTRPI, the position value POSV representing a position of a corner point P2 of the light transmission region LTRb and the size value SIZEV representing a height H and a width W of the light transmission region LTRa to the host processor 610. The data masking block 650 of the host processor 610 may perform a masking operation on input image data IDAT for the light transmission region LTR based on the light transmission region position information LTRPI representing the position value POSV and the size value SIZEV in a first mode (or a light transmission region off mode). Although FIGS. 12A and 12B illustrate examples of the light transmission regions LTRa and LTRb having the circular shape and the rectangular shape, a shape of the light transmission region LTR is not limited to the examples of FIGS. 12A and 12B.

In the electronic device 600 according to embodiments, the display panel 210 may include the light transmission region LTR overlapping the sensor module 130, the panel driver 720 may transfer the light transmission region position information LTRPI representing the position value POSV and the size value SIZEV to the host processor 610, the host processor 610 may perform the masking operation on the input image data IDAT for the light transmission region LTR in the first mode, and the host processor 110 may bypass the input image data IDAT for the light transmission region LTR in a second mode. Thus, an image may be selectively displayed at the light transmission region LTR. Accordingly, inconvenience of a user caused by a low resolution of the light transmission region LTR may be resolved, and light emitted by the light transmission region LTR may be prevented from reaching the sensor module 130.

Figure 13:
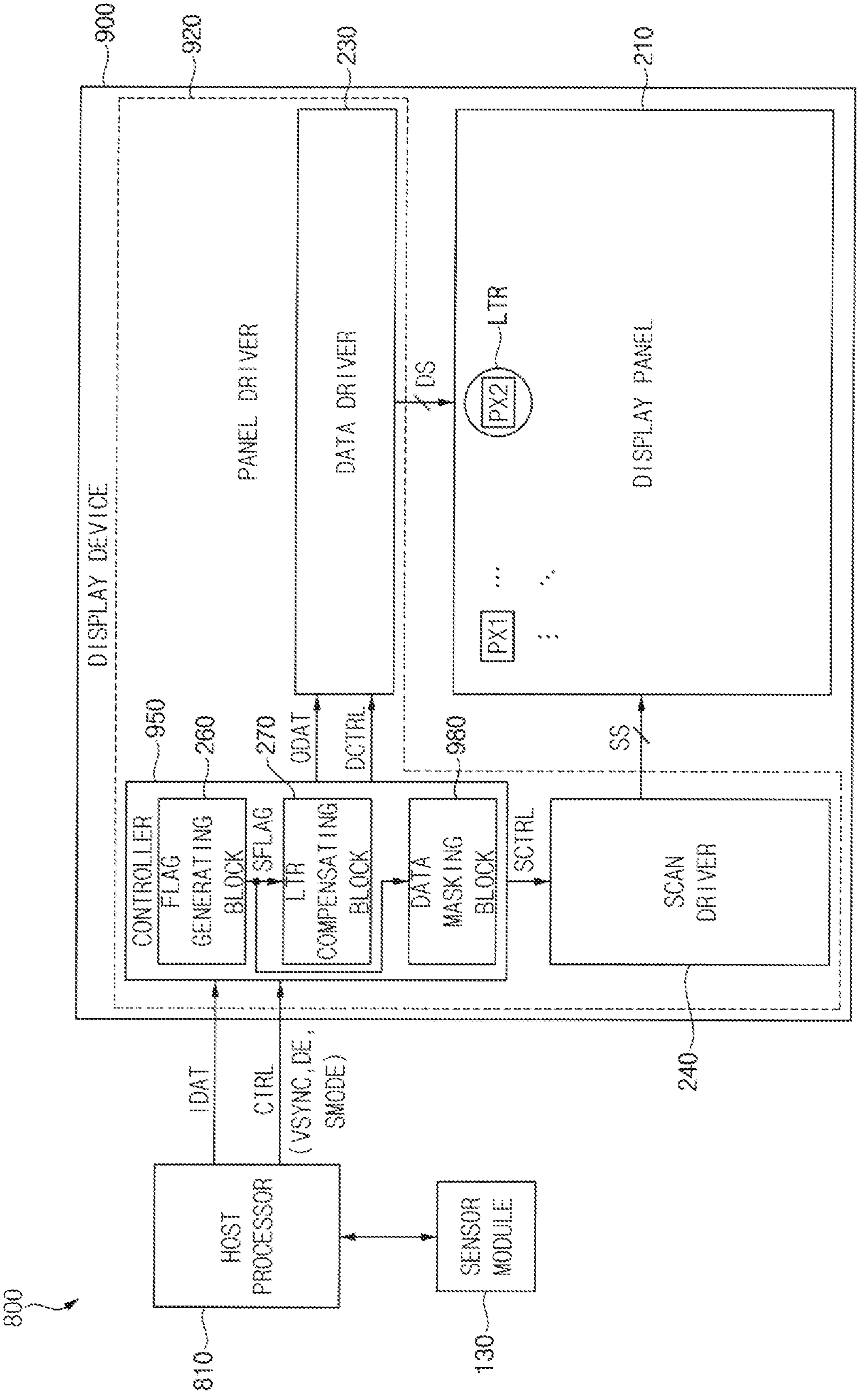
FIG. 13 is a schematic block diagram illustrating an electronic device according to embodiments.

FIG. 13 is a schematic block diagram illustrating an electronic device according to embodiments.

Referring to FIG. 13, an electronic device 800 according to embodiments may include a host processor 810, a sensor module 130 and a display device 900. The display device 900 may include a display panel 210 and a panel driver 920. The panel driver 920 may include a data driver 230, a scan driver 240 and a controller 950. The controller 950 may include a flag generating block 260, a light transmission region compensating block 270 and a data masking block 980. The electronic device 800 of FIG. 13 may have a similar configuration and a similar operation to an electronic device 100 of FIG. 1 or an electronic device 600 of FIG. 11, except at least that the panel driver 920 of the display device 900 may not transfer light transmission region position information LTRPI to the host processor 810, that the host processor 810 may transfer a mode signal SMODE to the panel driver 920 of the display device 900, and that the panel driver 920 of the display device 900 may selectively perform a masking operation according to the mode signal SMODE.

The panel driver 920 may receive, as a control signal CTRL, the mode signal SMODE representing a first mode (e.g., a light transmission region off mode) or a second mode (e.g., a light transmission region on mode) from the host processor 810. In some embodiments, the mode signal SMODE may represent the first mode in case that the light transmission region LTR is set as off, and may represent the second mode in case that the light transmission region LTR is set as on. In other embodiments, the mode signal SMODE may represent the first mode in case that the sensor module 130 is activated, and may represent the second mode in case that the sensor module 130 is inactivated. In still other embodiments, the mode signal SMODE may represent the first mode in case that the light transmission region LTR is set as off or in case that the sensor module 130 is activated, and may represent the second mode in case that the light transmission region LTR is set as on and the sensor module 130 is inactivated.

The panel driver 920 may perform a masking operation on input image data IDAT for the light transmission region LTR while the mode signal SMODE represents the first mode, and may bypass the input image data IDAT for the light transmission region LTR while the mode signal SMODE represents the second mode. In some embodiments, to perform the masking operation on the input image data IDAT for the light transmission region LTR, the data masking block 980 may receive a flag signal SFLAG representing a timing of receiving the input image data IDAT for the light transmission region LTR from the flag generating block 260, and may perform the masking operation on the input image data IDAT for the light transmission region LTR based on the flag signal SFLAG in the first mode.

In the electronic device 800 according to embodiments, the display panel 210 may include the light transmission region LTR overlapping the sensor module 130, the panel driver 920 may receive the mode signal representing the first mode or the second mode, the panel driver 920 may perform the masking operation on the input image data IDAT for the light transmission region LTR in the first mode, and the panel driver 920 may bypass the input image data IDAT for the light transmission region LTR in the second mode. Thus, an image may be selectively displayed at the light transmission region LTR. Accordingly, inconvenience of a user caused by a low resolution of the light transmission region LTR may be resolved, and light emitted by the light transmission region LTR may be prevented from reaching the sensor module 130.

Figure 14:
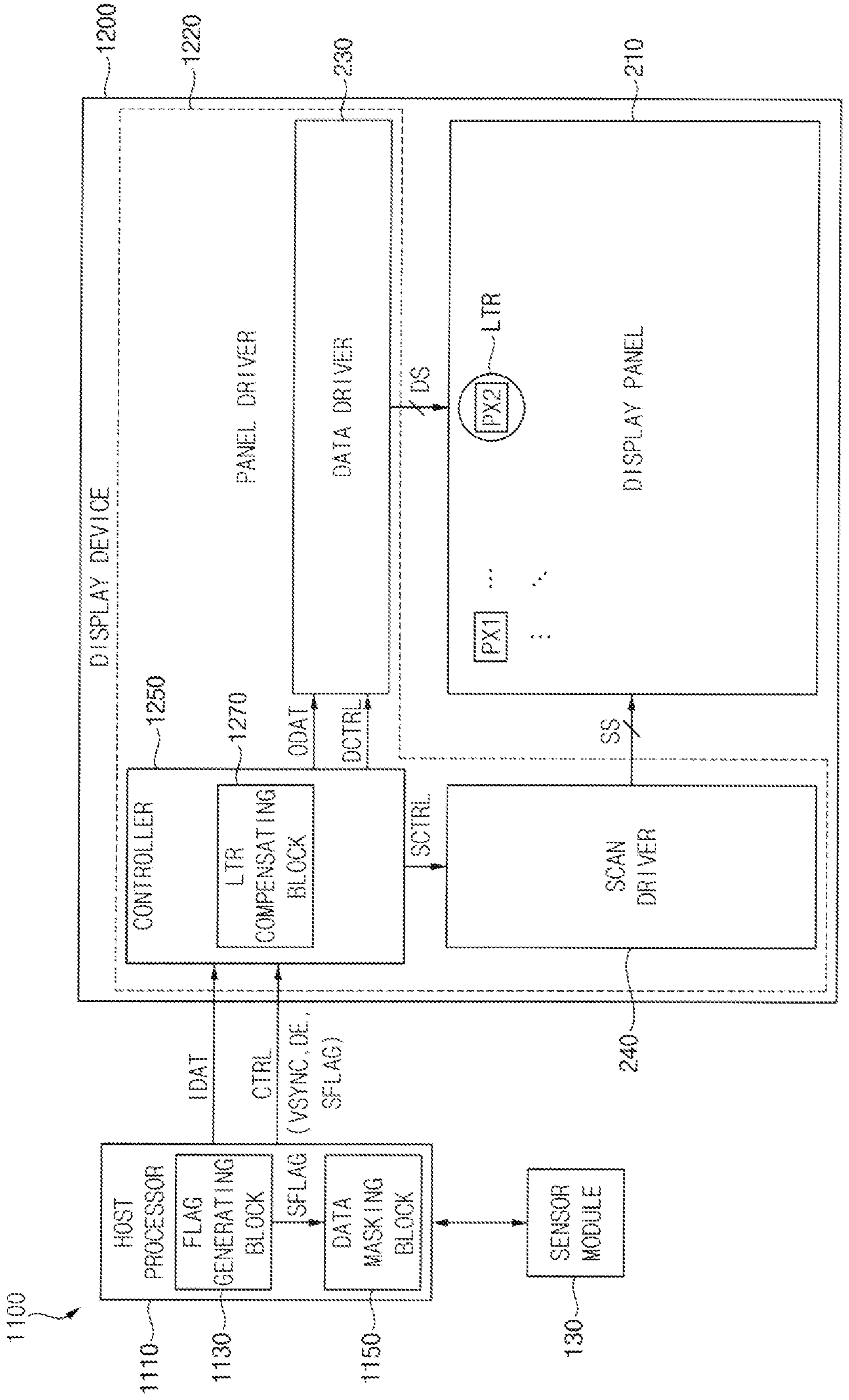
FIG. 14 is a schematic block diagram illustrating an electronic device according to embodiments.

FIG. 14 is a schematic block diagram illustrating an electronic device according to embodiments.

Referring to FIG. 14, an electronic device 1100 according to embodiments may include a host processor 1110, a sensor module 130 and a display device 1200. The host processor 1110 may include a flag generating block 1130 and a data masking block 1150. The display device 1200 may include a display panel 210 and a panel driver 1220. The panel driver 1220 may include a data driver 230, a scan driver 240 and a controller 1250. The controller 1250 may include a light transmission region compensating block 1270. The electronic device 1100 of FIG. 14 may have a similar configuration and a similar operation to an electronic device 100 of FIG. 1 or an electronic device 600 of FIG. 11, except at least that the panel driver 1220 of the display device 1200 may not transfer light transmission region position information LTRPI to the host processor 1110, and that the host processor 1110 may transfer a flag signal SFLAG to the panel driver 1220 of the display device 1200.

The flag generating block 1130 of the host processor 1110 may generate a flag signal SFLAG representing a timing of input image data IDAT for a light transmission region LTR, and may transfer, as a control signal CTRL, the flag signal SFLAG to the panel driver 1220. The light transmission region compensating block 1270 of the panel driver 1220 may perform a light transmission region compensation operation on the input image data IDAT for the light transmission region LTR based on the flag signal SFLAG received from the host processor 1110.

The data masking block 1150 of the host processor 1110 may receive the flag signal SFLAG from the flag generating block 1130, may perform a masking operation on the input image data IDAT for the light transmission region LTR based on the flag signal SFLAG in a first mode (e.g., a light transmission region off mode), and may bypass the input image data IDAT for the light transmission region LTR in a second mode (e.g., a light transmission region on mode). Thus, an image may be selectively displayed at the light transmission region LTR. Accordingly, inconvenience of a user caused by a low resolution of the light transmission region LTR may be resolved, and light emitted by the light transmission region LTR may be prevented from reaching the sensor module 130.

Figure 15:
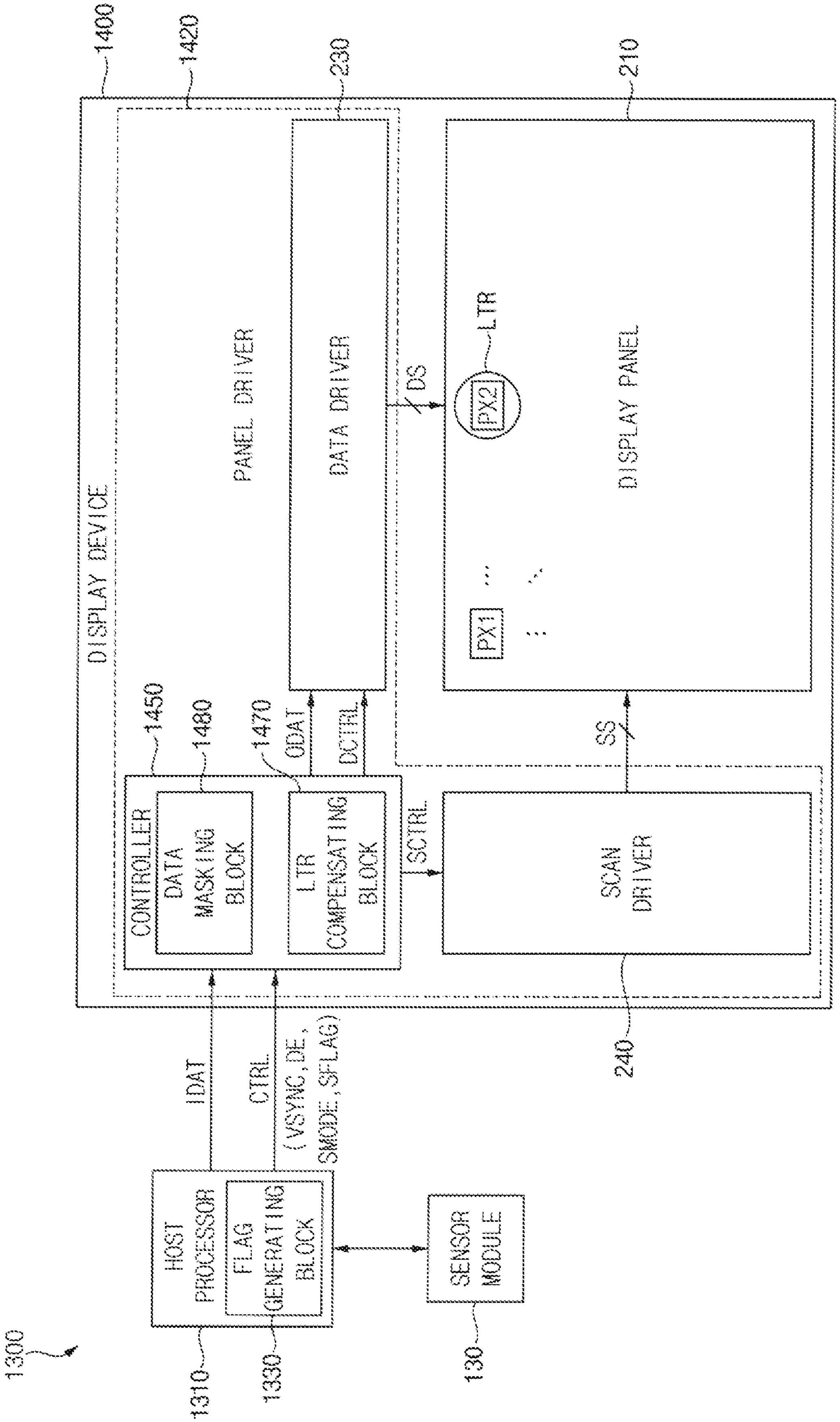
FIG. 15 is a schematic block diagram illustrating an electronic device according to embodiments.

FIG. 15 is a schematic block diagram illustrating an electronic device according to embodiments.

Referring to FIG. 15, an electronic device 1300 according to embodiments may include a host processor 1310, a sensor module 130 and a display device 1400. The host processor 1310 may include a flag generating block 1330. The display device 1400 may include a display panel 210 and a panel driver 1420. The panel driver 1420 may include a data driver 230, a scan driver 240 and a controller 1450. The controller 1450 may include a light transmission region compensating block 1470 and a data masking block 1480. The electronic device 1300 of FIG. 15 may have a similar configuration and a similar operation to an electronic device 800 of FIG. 13, except at least that the host processor 1310 may transfer a flag signal SFLAG to the panel driver 1420 of the display device 1400.

The flag generating block 1330 of the host processor 1310 may generate the flag signal SFLAG representing a timing of input image data IDAT for a light transmission region LT. The host processor 1310 may transfer, as a control signal CTRL, the flag signal SFLAG and a mode signal SMODE to the panel driver 1420. The light transmission region compensating block 1470 of the panel driver 1420 may perform a light transmission region compensation operation on the input image data IDAT for the light transmission region LTR based on the flag signal SFLAG received from the host processor 1310.

The data masking block 1480 of the panel driver 1420 may selectively perform a masking operation on the input image data IDAT for the light transmission region LTR according to the mode signal SMODE. For example, in a case where the mode signal SMODE represents a first mode (e.g., a light transmission region off mode), the data masking block 1480 may perform the masking operation on the input image data IDAT for the light transmission region LTR based on the flag signal SFLAG. Further, in a case where the mode signal SMODE represents a second mode (e.g., a light transmission region on mode), the data masking block 1480 may bypass the input image data IDAT for the light transmission region LTR. Thus, an image may be selectively displayed at the light transmission region LTR. Accordingly, inconvenience of a user caused by a low resolution of the light transmission region LTR may be resolved, and light emitted by the light transmission region LTR may be prevented from reaching the sensor module 130.

The disclosure may be applied to any display device and any electronic device. For example, the disclosure may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the disclosure. Accordingly, all such modifications are intended to be included within the scope of the disclosure. Therefore, it is to be understood that the foregoing is illustrative of various embodiments and is not to be construed as limited to the specific embodiments disclosed, and that modifications to the disclosed embodiments, as well as other embodiments, are intended to be included within the scope of the disclosure.

What is claimed is:

1. An electronic device comprising:
a processor;
a sensor module; and
a display device including:
a display panel including a normal display region in which first pixels are disposed without any light transmitting windows;
a light transmitting pixel region in which second pixels are disposed with at least one light transmitting window, the light transmitting pixel region overlapping the sensor module; and
a panel driver driving the display panel based on input image data received from the processor, and transferring light transmitting pixel region position information representing a position of the light transmitting pixel region from the panel driver to the processor, wherein
the processor performs a masking operation on the input image data for the light transmitting pixel region based on the light transmitting pixel region position information in a first mode that is a light transmitting pixel region off mode in which the second pixels display a black image,
the processor passes-through the input image data for the light transmitting pixel region in a second mode that is a light transmitting pixel region on mode in which the second pixels emit light,
a size of a driving transistor of each of the second pixels is greater than a size of a driving transistor of each of the first pixels, wherein the light transmitting pixel region has a lower pixel density than the normal display region, and
the light transmitting pixel region position information transferred from the panel driver to the processor represents a position value and a size value of the light transmitting pixel region in which the second pixels are disposed with at least one light transmitting window, said light transmitting pixel region being located at a position within the normal display region in which the first pixels are disposed without any light transmitting windows.

2. The electronic device of claim 1, wherein the processor converts gray levels represented by the input image data for the light transmitting pixel region into a minimum gray level by performing the masking operation.

3. The electronic device of claim 1, wherein
the processor determines an operation mode for the display device as the first mode in case that the light transmitting pixel region is set as off, and
the processor determines the operation mode for the display device as the second mode in case that the transmitting pixel region is set as on.

4. The electronic device of claim 1, wherein
the processor determines an operation mode for the display device as the first mode in case that the sensor module is activated, and the processor determines the operation mode for the display device as the second mode in case that the sensor module is inactivated.

5. The electronic device of claim 1, wherein the panel driver includes a flag generating block generating a flag signal representing a timing of receiving the input image data for the light transmitting pixel region.

6. The electronic device of claim 5, wherein the flag signal has a first level while the input image data for the normal display region is received, and the flag signal has a second level while the input image data for the light transmitting pixel region is received.

7. The electronic device of claim 5, wherein the panel driver further includes a light transmitting pixel region compensating block performing a light transmitting pixel region compensation operation on the input image data for the light transmitting pixel region based on the flag signal.

8. The electronic device of claim 1, wherein a number of the second pixels disposed in the light transmitting pixel region is less than a number of the first pixels disposed in the normal display region, with respect to a same area, and the at least one light transmitting window is disposed in the light transmitting pixel region such that external light reaches the sensor module through the at least one light transmitting window.

9. The electronic device of claim 1, wherein each of the first pixels includes first light emitting regions emitting lights having different colors, and each of the second pixels includes:

second light emitting regions emitting lights having the different colors; and the at least one light transmitting window transmitting external light such that the external light reaches the sensor module.

10. The electronic device of claim 1, wherein the sensor module includes at least one of a camera, a face recognition sensor, a proximity sensor, and a motion sensor.

11. A display device comprising:

a display panel including:

a normal display region in which first pixels are disposed without any light transmitting windows; and a light transmitting pixel region in which second pixels are disposed with at least one light transmitting window, the light transmitting pixel region overlapping a sensor module; and a panel driver, wherein the panel driver drives the display panel based on input image data received from a processor, the panel driver receives a mode signal representing a first mode or a second mode, the panel driver performs a masking operation on the input image data for the light transmitting pixel region in the first mode in which the second pixels display a black image, the panel driver passes-through the input image data for the light transmitting pixel region in the second mode, a size of a driving transistor of each of the second pixels is greater than a size of a driving transistor of each of the first pixels, wherein the light transmitting pixel region has a lower pixel density than the normal display region, the mode signal represents the first mode in case that the light transmitting pixel region is set as off or in case that the sensor module is activated, and the mode signal represents the second mode in case that the light transmitting pixel region is set as on and the sensor module is inactivated.

12. The display device of claim 11, wherein the panel driver includes:

a flag generating block generating a flag signal representing a timing of receiving the input image data for the light transmitting pixel region; and a data masking block performing the masking operation on the input image data for the light transmitting pixel region based on the flag signal in the first mode.

13. An electronic device comprising:

a processor;

a sensor module; and a display device including:

a display panel including:

a normal display region in which first pixels are disposed without any light transmitting windows; and a light transmitting pixel region in which second pixels are disposed with at least one light transmitting window, the light transmitting pixel region overlapping the sensor module; and a panel driver driving the display panel based on input image data received from the processor, wherein the processor transfers a flag signal representing a timing of receiving the input image data for the light transmitting pixel region from the processor to the panel driver, a masking operation on the input image data for the light transmitting pixel region is performed based on the flag signal in a first mode in which the second pixels display a black image, the input image data for the light transmitting pixel region is passed-through in a second mode, a size of a driving transistor of each of the second pixels is greater than a size of a driving transistor of each of the first pixels, wherein the light transmitting pixel region has a lower pixel density than the normal display region, an operation mode for the display device is determined as the first mode in case that the light transmitting pixel region is set as off or in case that the sensor module is activated, and the operation mode for the display device is determined as the second mode in case that the light transmitting pixel region is set as on and the sensor module is inactivated.

* * * * *